(12) United States Patent
Isaacks et al.

(10) Patent No.: US 9,059,576 B2
(45) Date of Patent: Jun. 16, 2015

(54) CABLE CONSOLIDATION BOXES AND SYSTEMS

(75) Inventors: Scott J. Isaacks, Seattle, WA (US); Sean McCloud, Bothell, WA (US); Joshua Ray Knott, Burlington, WA (US)

(73) Assignee: DIRTT ENVIRONMENTAL SOLUTIONS, LTD. (CA)

( * ) Notice: Subject to any disclaimer, the term of this patent is extended or adjusted under 35 U.S.C. 154(b) by 0 days.

(21) Appl. No.: 13/579,269
(22) PCT Filed: May 17, 2012
(86) PCT No.: PCT/US2012/038390
 § 371 (c)(1),
 (2), (4) Date: Aug. 15, 2012
(87) PCT Pub. No.: WO2012/158940
 PCT Pub. Date: Nov. 22, 2012

(65) Prior Publication Data
US 2014/0103790 A1   Apr. 17, 2014

Related U.S. Application Data

(60) Provisional application No. 61/487,500, filed on May 18, 2011.

(51) Int. Cl.
 *H02G 3/08* (2006.01)
 *H02G 3/00* (2006.01)
 (Continued)

(52) U.S. Cl.
 CPC ............ *H02G 3/081* (2013.01); *H02G 3/00* (2013.01); *H02G 15/10* (2013.01); *H04Q 1/025* (2013.01); *H04Q 1/06* (2013.01)

(58) Field of Classification Search
 CPC ............ H02G 3/80; H02G 3/81; H02G 3/08; H02G 3/081; H02G 3/086; H02G 3/00; H02G 15/10; H04Q 1/13; H04Q 1/025; H04Q 1/06; G08B 13/08; E05B 45/06; H05K 5/00; H05K 5/02; H01H 9/02
 USPC ............ 174/50, 53, 520, 480, 481, 559, 560; 220/3.2–3.9, 4.02; 361/600, 601, 361/679.01, 679.02, 724, 730, 752; 385/134, 135
 See application file for complete search history.

(56) References Cited

U.S. PATENT DOCUMENTS

| D260,878 S | 9/1981 | Dolinar |
| 4,381,063 A | 4/1983 | Leong |

(Continued)

FOREIGN PATENT DOCUMENTS

| CA | 2375554 | 9/2003 |
| GB | 2432979 | 6/2007 |

(Continued)

OTHER PUBLICATIONS

International Search Report and Written opinion for PCT/US2012/038390 mailed Dec. 18, 2012.

(Continued)

*Primary Examiner* — Angel R Estrada
(74) *Attorney, Agent, or Firm* — Workman Nydegger

(57) ABSTRACT

Implementations of the present invention include a cable consolidation box for providing secure access to networks with multiple security classifications. More specifically, the cable consolidation box can allow a network administrator to physically secure network cables originating from multiple networks having distinct security classifications. In one or more implementations, the cable consolidation box can have a plurality of entry points that are segregated from one another. Each of the plurality of entry points can be associated with a corresponding plurality of segregated connection chambers. The cable consolidation box can thus allow for various types of cables, with various levels of security classification, to be associated with a single cable consolidation box.

20 Claims, 5 Drawing Sheets

(51) Int. Cl.
*H02G 15/10* (2006.01)
*H04Q 1/02* (2006.01)
*H04Q 1/06* (2006.01)

(56) References Cited

U.S. PATENT DOCUMENTS

| | | | |
|---|---|---|---|
| 4,596,095 A | 6/1986 | Chalfant | |
| 4,640,564 A | 2/1987 | Hill | |
| 4,721,476 A | 1/1988 | Zeliff | |
| 4,729,614 A | 3/1988 | Nadler | |
| 4,778,399 A | 10/1988 | Schenk | |
| 4,850,014 A | 7/1989 | Gillis | |
| 5,052,157 A | 10/1991 | Ducroux | |
| 5,057,647 A | 10/1991 | Bogden | |
| D324,207 S | 2/1992 | Nieves | |
| 5,272,297 A | 12/1993 | Reichow | |
| 5,285,009 A | 2/1994 | Bowman | |
| 5,350,884 A | 9/1994 | Littrell | |
| D354,736 S | 1/1995 | Hallett | |
| D366,247 S | 1/1996 | Mazura | |
| D367,859 S | 3/1996 | Beaumont | |
| 5,575,668 A | 11/1996 | Timmerman | |
| 5,638,256 A * | 6/1997 | Leach et al. | 174/58 |
| 5,749,188 A | 5/1998 | Belbenoit | |
| 5,796,037 A | 8/1998 | Young | |
| 5,907,127 A | 5/1999 | Daoud | |
| 5,933,563 A * | 8/1999 | Schaffer et al. | 385/135 |
| 5,945,633 A | 8/1999 | Ott | |
| D422,265 S | 4/2000 | Noble | |
| 6,102,229 A | 8/2000 | Moncourtois | |
| 6,103,973 A * | 8/2000 | Sharp | 174/666 |
| D437,586 S | 2/2001 | Sonntag | |
| D450,666 S | 11/2001 | Scribner | |
| 6,362,951 B1 * | 3/2002 | Moribe et al. | 361/600 |
| D463,775 S | 10/2002 | Byrne | |
| 6,467,640 B1 | 10/2002 | Hung | |
| 6,467,859 B2 | 10/2002 | Branz | |
| D472,213 S | 3/2003 | Byrne | |
| 6,603,660 B1 * | 8/2003 | Ehn et al. | 361/694 |
| 6,621,975 B2 | 9/2003 | Laporte | |
| 6,796,437 B2 * | 9/2004 | Krampotich et al. | 211/26 |
| 6,812,836 B2 * | 11/2004 | Soloway et al. | 340/542 |
| 6,974,348 B2 * | 12/2005 | Bentley | 439/540.1 |
| 6,999,305 B1 * | 2/2006 | Calcote | 361/601 |
| D516,513 S | 3/2006 | Kissinger | |
| 7,045,706 B1 | 5/2006 | Lincoln | |
| 7,121,853 B1 | 10/2006 | Gast | |
| 7,136,278 B2 | 11/2006 | Allen | |
| D539,762 S | 4/2007 | Johnson | |
| 7,270,562 B1 | 9/2007 | Trout | |
| D560,609 S | 1/2008 | Rosenthal | |
| 7,432,441 B2 * | 10/2008 | Liang | 174/50 |
| 7,602,766 B2 * | 10/2009 | Shtivelman | 370/352 |
| 7,762,839 B2 * | 7/2010 | Chen | 439/540.1 |
| D626,069 S | 10/2010 | Byrne | |
| 7,875,799 B2 * | 1/2011 | Fransen et al. | 174/66 |
| 8,153,910 B1 | 4/2012 | Penczak | |
| 2002/0195261 A1 | 12/2002 | Harrison | |
| 2003/0228121 A1 * | 12/2003 | Dwyer et al. | 385/134 |
| 2005/0164535 A1 | 7/2005 | Isaacks | |
| 2005/0246982 A1 | 11/2005 | MacMillan | |
| 2006/0221622 A1 | 10/2006 | Howell | |
| 2006/0233355 A1 | 10/2006 | Markiewicz | |
| 2007/0077800 A1 | 4/2007 | Isaacks | |
| 2008/0057758 A1 | 3/2008 | Walter | |
| 2008/0131132 A1 | 6/2008 | Solheid | |
| 2008/0197129 A1 | 8/2008 | Gosche | |
| 2009/0205864 A1 | 8/2009 | McCarthy | |
| 2010/0037554 A1 | 2/2010 | Oh | |
| 2010/0051308 A1 | 3/2010 | Hansen | |
| 2011/0181163 A1 | 7/2011 | Han | |
| 2012/0118602 A1 | 5/2012 | Remmert | |
| 2013/0291740 A1 | 11/2013 | Seitz | |

FOREIGN PATENT DOCUMENTS

| | | |
|---|---|---|
| JP | 2002118937 | 4/2002 |
| JP | 3334621 | 8/2002 |
| JP | 2005102429 | 4/2005 |
| KR | 2020090001720 | 2/2009 |
| KR | 100969193 | 7/2010 |
| WO | 2004093278 | 10/2004 |

OTHER PUBLICATIONS

Canadian Office Action for PCT No. US2012033378 dated Dec. 2, 2014.
European Search Report for PCT/US2012/038390, Mailed Sep. 18, 2014.
National Security Telecommunications and Information Systems Security Instruction (NSTISSI No. 7003). Dec. 13, 1996. "Protective Distribution Systems (PDS)." NSTISSI No. 7033. 13pp. See pp. 7-8 (Annex B) specifically.
SMED International, nd. "Stay on top of your technology." 28 pp.
International Search Report and Written Opinion for PCT/US2012/033378 mailed Oct. 30, 2012.
International Search Report and Written Opinion for PCT/US2012/065920 mailed Feb. 28, 2013.
European Search Report for PCT/US2012/033378, Mailed Nov. 19, 2014.

* cited by examiner

CABLE CONSOLIDATION BOXES AND SYSTEMS

CROSS-REFERENCE TO RELATED APPLICATIONS

The present invention is a 35 U.S.C. §371 National Stage of PCT of PCT/US12/38390, filed on May 17, 2012, entitled "CABLE CONSOLIDATION BOXES AND SYSTEMS," which claims the benefit of priority to U.S. Provisional Application No. 61/487,500, filed May 18, 2011, entitled "Cable Consolidation Box." The entire content of each of the aforementioned patent applications is incorporated by reference herein.

BACKGROUND OF THE INVENTION

1. Technical Field

The present disclosure relates generally to devices, methods, and systems for securing and distributing networks and/or network cabling.

2. Background and Relevant Art

Security concerns in data and communication infrastructures have increased in importance as more individuals, businesses, government, and military organizations increase reliance on data and communication networks. For example, both government and military agencies have adopted physical security standards for sensitive information facilities, such as the DCID 6/9 and NSTISSI, which these and all related documents are herein incorporated in their entirety. Providing secured cabling and cabling connections, which form the data and communication networks, is a critical aspect of securing data and communication network infrastructure.

Communication devices, such as computers, telephones, fax machines and other devices, often receive and transmit information through cables. For instance, fiber optic cables, copper cables, and other communication cables may carry the information to and from the communication devices. Cable boxes are often used as connection points to organize the cables within a communication network. Most office buildings have at least one cable box, such as between the point at which a data cable enters a building and the point at which a data cable terminates at a communication device.

Cable boxes can include, for example, consolidation boxes, Multi-User Telecommunication Outlet Assembly (MUTOA), and service boxes. An installer or a network architect can locate the consolidation boxes in a ceiling, floor, or inside a wall. The consolidation boxes can provide network access and service to many different end users. Cable bundles, also known as "trunk lines" and "primary cables," can contain many individual cable strands. Cable bundles may enter into the consolidation box and can separate into smaller bundles or individual cables and proceed to several different service boxes. Smaller bundles or individual cables are also known as "branch lines" and "outbound cables."

Similar to the consolidation boxes, the installer can locate the service boxes in a ceiling, or a floor, or inside a wall. Unlike consolidation boxes, service boxes may service a single end user or a small number of end users. Outbound cables from a consolidation box may enter into a service box through a designated entry point. A service box also may receive power cables through a designated entry point.

The network architect can secure connector modules to the ends of the outbound cables and power cables. The connector modules may contain one or more connector ports. Examples of connector ports include power outlets, phone jacks, and other connector ports. A cable that can connect directly to a communication device can have a cable plug on an open end, which can couple to the connector port.

Since conventional communication cables terminate, connect, and/or divide within cable boxes, including both consolidation boxes and service boxes, these cable boxes are an important component in maintaining a secure data and communications infrastructure. For example, network maintenance may demand access to a consolidation or service box to enable reconfiguration of the cabling located therein. At the same time, security concerns may demand that only authorized personnel can access the cable boxes. Moreover, some facilities may have multiple data and/or communication networks. In such case, each network may have different security requirements.

Typically, in order to maintain security, conventional cable boxes (including both consolidation boxes and service boxes) have a capability to accept only one type of classified network. Thus, a facility with several different levels of classified networks may need separate cable boxes for each of the classified networks. In such situation, the network architect can install a multiple cable boxes, in order to maintain security for each network classifications. Depending on the design of a particular facility, accommodating separate cable boxes for each network can be difficult or impossible. This is especially true with regard to consolidation boxes, which typically have much larger dimensions than service boxes.

These larger consolidation boxes that house secure data can be difficult to safeguard from unauthorized access. Even if lockable, consolidation boxes often have weak points, and an unauthorized person seeking access to the box, usually, can bend or break the box. Some conventional consolidation boxes can be removed from a floor or ceiling with a simple screwdriver. Similarly, some consolidation boxes can allow provide access to unauthorized personnel through cable entry or exit points in the box.

Thus, there are a number of disadvantages in the art of network cable distribution that can be addressed.

BRIEF SUMMARY OF THE INVENTION

Implementations of the present invention overcome one or more of the foregoing or other problems in the art with systems and apparatus for securing access and routing cables with multiple security classifications. More specifically, the systems and apparatus provided herein include a single consolidation box that securely houses and allows routing of cables having distinct security classifications. For example, in one or more implementations a single consolidation box can include multiple chambers and doors configured to organize, secure, and route cables with distinct security classifications while preventing unauthorized access to one or more of the cables.

For example, one implementation of a cable consolidation box includes a housing and one or more primary connection chambers one or more primary connection chambers disposed within the housing. The one or more primary connection chambers are configured to physically secure primary network cables from a first security classification network and a second security classifications network. Additionally, the cable consolidation box includes a first and second outbound connection chambers disposed within the housing. The first outbound connection chamber is configured to secure secondary network cables for connecting to the first security classification network. The second outbound connection chamber is configured to secure secondary network cables for connecting to the second security classification network. The cable consolidation box also includes a barrier separating the first and second outbound connection chambers. The barrier prevents access to one of the first and second outbound connection chamber from the other of the first and second outbound chambers. The cable consolidation box further includes a first door coupled to the housing and sized and configured to selectively provide access to the first outbound connection chamber, a second door coupled to the housing and sized and configured to selectively provide access to the second outbound connection chamber, and a third door coupled to the housing and sized and configured to selectively provide access to the one or more primary connection chambers. The cable consolidation box further includes one or more locks configured to selectively secure one or more of the first, the second, and the third doors to the housing.

Another implementation of a cable consolidation box includes a housing and one or more primary connection chambers configured to secure primary network cables from both a first security classifications network and a second security classifications network. The cable consolidation box also includes first and second outbound connection chambers disposed within the housing. A first set of staggered connector modules are disposed between the first outbound connection chamber and the one or more primary connection chambers. A second set of staggered connector modules are disposed between the second outbound connection chamber and the one or more primary connection chambers. A barrier separates the first and second outbound connection chambers. The barrier prevents access to one of the first and second outbound connection chamber from the other of the first and second outbound chambers. Moreover, the cable consolidation box includes a plurality of doors coupled to the housing and sized and configured to provide selective access to the first and second outbound connection chambers. The cable consolidation box further includes one or more locks coupled to one or more of the housing and one or more doors of the plurality of doors, and configured to selectively prevent access to one or more of the first and second outbound connection chambers.

In addition to the foregoing, a secure network cable distribution system includes a first primary network cable of a first security classification network, a second primary network cable of a second security classification network, and a cable consolidation box. The cable consolidation box includes a housing and one or more connection chambers securing the first primary network cable and the second primary network cable. Furthermore, the cable consolidation box includes a first outbound connection chamber having a first connector module connected to the first primary network cable. The cable consolidation box also includes a second outbound connection chamber having a second connector module connected to the second primary network cable. Moreover, the cable consolidation box includes a barrier separating the first and second outbound connection chambers. The barrier prevents access to one of the first and second outbound connection chamber from the other of the first and second outbound chambers. The cable consolidation box also includes a pair of doors coupled to the housing. The doors are sized and configured to provide selective access to the first and second outbound connection chambers. Additionally, the cable consolidation box includes one or more locks configured to selectively prevent access to one or more of the first and second outbound connection chambers. The system also includes a first service box located remotely for the cable consolidation box, and a second service box located remotely for the cable consolidation box and the first service box. A first set of secondary network cables run from the first connector module in the first outbound connection chamber to the first service box. Furthermore, a second set of secondary network cables rung from the second connector module in the second outbound connection chamber to the second service box.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EXAMPLE EMBODIMENTS

Figure 1:
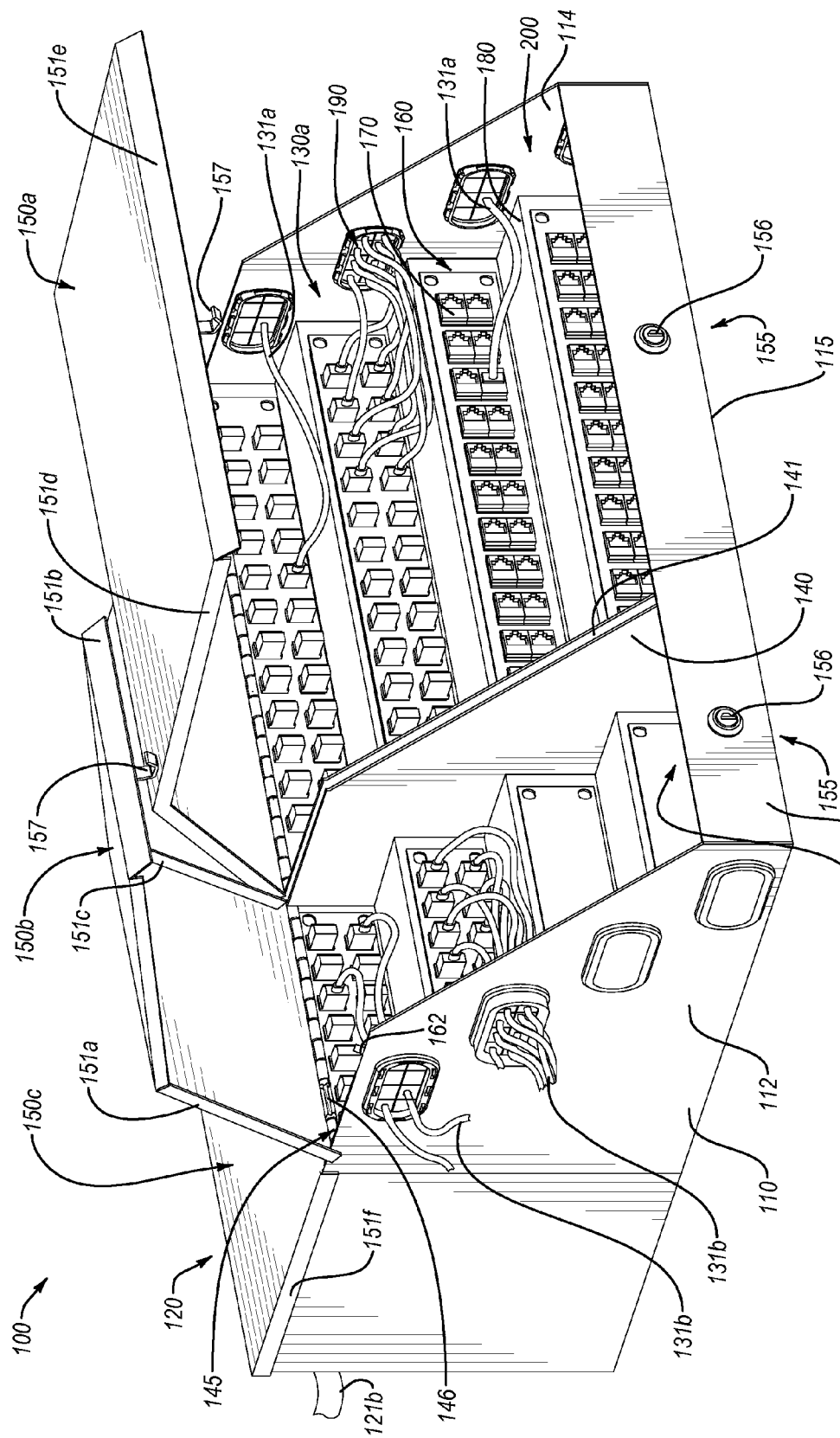
FIG. 1 illustrates a front perspective view of a consolidation box in accordance with one or more implementations of the present invention.

Implementations of the present invention overcome one or more of the foregoing or other problems in the art with systems and apparatus for securing access and routing cables with multiple security classifications. More specifically, the systems and apparatus provided herein include a single consolidation box that securely houses and allows routing of cables having distinct security classifications. For example, in one or more implementations a single consolidation box can include multiple chambers and doors configured to organize, secure, and route cables with distinct security classifications while preventing unauthorized access to one or more of the cables.

As will be understood more fully in light of the description here below, one or more implementations of the present invention provide one or more devices, systems, and/or components that make it possible to secure, within a single consolidation box, multiple data and communication cables that have differing security classifications, types of cables, and types of connections. As used herein, a cable box can include any box, panel, outlet, or container that can be used as a point of connection, distribution, or junction within a data and communication network and/or electrical power infrastructure. Cable boxes can include both consolidation boxes for serving multiple end users and/or service boxes, and service boxes serving a single or limited number of end users. In at least one implementation, a consolidation box can service between 12 and 16 end users.

The consolidation boxes of one or more implementations can securely connect or route cables from various portions of one or more power, electrical, or communication/data networks (hereinafter "networks"). In particular, in one or more implementations the consolidation box can provide a connection between two sets or bundles of network cables. As used herein, "network cables" refer to any cable, wire, cord, or line that can be used as a communication medium or electrical transfer medium for a network (e.g., a data network, a telecommunication network, power network, electrical network etc.). Network cables include Ethernet, fiber optic, telephone, power, copper, or any other communication or cable in any form or standard. For example, the consolidation box can securely connect network cables of a particular security classification from distinct portions of one or more networks, by selectively restricting access to one or more connection points between the network cables.

In general, consolidation boxes can connect various portions of a communication network. Commonly, consolidation boxes are at a mid-point in a network layout. For instance, a consolidation box can provide a connection between large cables (e.g., trunk lines or primary cables), and smaller cables (e.g., branch lines, individual lines, or secondary cables). The smaller cables are then eventually connected to one or more endpoints to which an end user will connect directly. In particular, a consolidation box can accept, divide, and/or organize one or more primary cables to facilitate the distribution of the network through secondary cables.

For instance, the primary network cables can include connectors and/or can couple (in electronic communication) with one or more connection elements and/or connector modules within the consolidation box. In particular, the connection elements and/or connector modules can allow the installer to connect secondary network cables to the primary network cables. Thus, the consolidation box can divide and/or segregate primary network cables and/or the secondary network cables that may connect to the primary cables. Furthermore, the cable consolidation box can segregate the connection elements (e.g., connector ports) and/or connector modules (and consequently, secondary network cables), for example, based on security classification.

The secondary cables can extend to one or more service points (e.g., services boxes or user end points). Such service points can provide a connection interface for cables and cords that can connect to individual communication devices, such as telephones, fax machines, computers, servers, or any other device that may connect to a network. Accordingly, a secure network distribution system can secure and connect primary network cables, from various security classification networks, to the secondary network cables within the consolidation box. Moreover, the secure network distribution system can provide access to connect to the various security classification networks at one or more service points connect to the consolidation box by secondary cables.

Depending on the specific use of the consolidation box, the physical location of the consolidation box can vary from one implementation to the next. For example, a network architect can design network architecture such that the consolidation box is located in the interior space between raised floors, in a suspended ceiling, or between walls. In at least one implementation, a network architect can cover the consolidation box with a removable floor, ceiling or wall panel such that the consolidation box is hidden from plain view.

Consolidation boxes in accordance with one or more implementations can have a size corresponding to either a standard ceiling tile or standard floor tile. Having a consolidation box that is the same size as a ceiling or floor tile, can simply installation of the box as only one ceiling or floor tile must be removed to install. This configuration can also make servicing the consolidation box easier as only a single floor or ceiling tile must be removed to gain access. While the sizes vary, a common size for floor and ceiling tiles is 24 inches by 24 inches. Thus, one or more implementations, the consolidation box can have a footprint size of 24 inches by 24 inches. In other implementations, panels do not cover the consolidation box, and as such, the consolidation box remains in plain view on a floor, in a ceiling, or on a wall. In still further implementations, the consolidation box has a larger or smaller footprint size.

While consolidation boxes may service or connect service boxes to a network, service boxes are not required. For example, in one or more implementations, a network architect can locate the consolidation box within a wall proximate to a communication device. In such implementations, secondary cables can connect one or more communication devices directly to the consolidation box.

As described above, a network architect may want to limit access to communications network connections due to security concerns. Moreover, there may be a need to have two or more types of network cables or connections at a particular location, with each connection having differing security classification levels. Therefore, according to one or more implementations, the consolidation box can secure the network cables and connections and keep the various security classifications separate, while at the same time providing the convenience and efficiency of a single consolidation box. Thus, as described above, the consolidation box can secure, separate, and/or connect the primary network cables to the secondary network cables. In one or more implementations, the consolidation box can separate or organize cables based on the particular security classification of the primary and/or secondary network cables.

Figure 2:
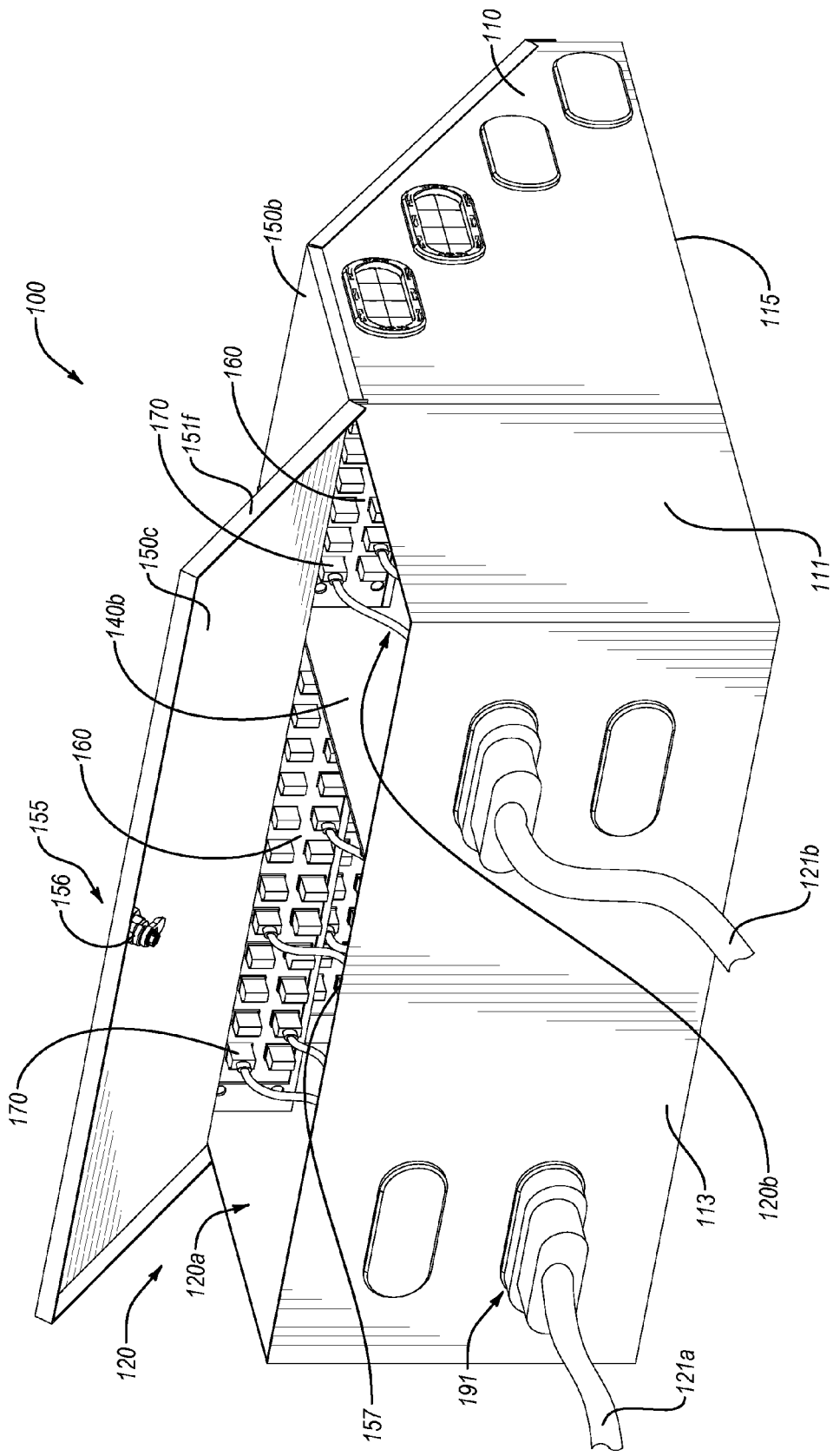
FIG. 2 illustrates a back perspective view of the consolidation box of FIG. 1.

Referring now to the Figure, FIGS. 1 and 2 illustrate one implementation of a consolidation box 100. As shown, the cable consolidation box 100 can include a housing 110 that generally forms a box or container. The housing 110 can have one or more sidewalls such as sidewalls 111, 112, 113, 114 and a base 115 secured thereto. Additionally, such sidewalls 111, 112, 113, 114 can be substantially flat, arcuate, or can have an irregular shape. The sidewalls 111, 112, 113, 114 also can form various angles with respect to one another.

For instance, sidewalls 111 and 112 can form substantially 90 degree angle. Those skilled in the art, however, should appreciate that sidewalls 111, 112, 113, 114 can have different shapes and can form different angles with respect to one another. Accordingly, the housing 110 can have various shapes. For instance, the housing 110 can have substantially rectangular shape. Alternatively, the housing 110 can have cylindrical or other shapes.

In any event, the housing 110 can include various chambers. In particular, FIGS. 1 and 2 illustrate that the housing 110 includes a primary connection chamber 120 and two outbound connection chambers 130a, 130b. In alternative implementations, the housing 110 can include more than one primary connection chamber 120 and/or more than two outbound connection chambers. The primary connection chamber 120 can accept primary network cables 121a, 121b. The outbound connection chambers 130a, 130b, on the other hand can accept and route secondary network cables 131a, 131b.

In one or more implementations, the network cables 121a, 121b, 131a, 131b can each include a particular security classification (e.g., unclassified, sensitive, restricted, confidential, secret, top secret). Thus, each of the connection chambers 120, 130a and 130b can accommodate a particular type of cable, connection and/or a separate level of security classification. For example, one of the outbound connection chambers 130a, 130b can comprise a secure connection chamber and the other can comprise a non-secure connection chamber. Thus, the outbound connection chambers 130a, 130b can separate the secondary network cables 131a, 131b, at least in part, based on security classification of the secondary network cables.

In one or more implementations, the first outbound connection chamber 130a can comprise a non-secure or unclassified chamber and the second outbound connection chamber 130b can comprise a secure or classified chamber. Thus, for instance, the system administrator can limit access to the second outbound connection chamber 130b only to the users that have a security clearance to access a "classified" security classification network. The terms "classified" and "unclassified" are used for illustrative purposes only and are intended to encompass identification of any first and second security or other classifications. In one or more implementations, the first and the second security classifications may differ one from another.

Similarly, the installer can connect primary network cables 121a or portions thereof with a different or second security classification (e.g., "unclassified") to the first outbound connection chamber 130a. Accordingly, the outbound connection chamber 130a can have a designation of "unclassified." Thus, users with a security clearance to access an "unclassified" security classification network can access the first outbound connection chamber 130a. It should be noted that any outbound connection chamber 130a, 130b can house both "classified" and "unclassified" secondary network cables in alternative implementations.

In at least one implementation, the primary connection chamber 120 can include one or more sub-connection chambers 120a, 120b (see FIG. 2). The sub-connection chambers 120a, 120b can have different security classifications one from another similar to that described above in relation to the outbound connection chambers 130a, 130b. Thus, each of the sub-connection chambers 120a, 120b can receive and route secure or non-secure primary cables. Alternatively, the primary connection chamber 120 can comprise a single unsegregated chamber.

In one or more implementations, the cable consolidation box 100 can include one or more connector modules 160. The connector modules 160 can separate the outbound connection chambers 130a, 130b from the primary connection chamber 120. Furthermore, the connector modules 160 can block users' access between the outbound connection chambers 130a, 130b and the primary connection chamber 120. The installer or network administrator can allow specific users to access the outbound connection chambers 130a, 130b while restricting access to the primary connection chamber 120 (or the reverse). In other words, users accessing the outbound connection chambers 130a, 130b may not access the primary connection chamber 120 as the connector modules 160 may prevent access to the primary connection chamber 120.

The connector modules 160 also can connect the primary network cables 121a, 121b to the secondary network cables 131a, 131b. For example, the connector modules 160 can have one or more connector ports 170. In one or more implementations, the connector ports 170 can be on one or more sides of the connector modules 160. More specifically, the connector modules 160 can include connector ports 170 accessible within the primary connection chamber 120 and/or the outbound connection chambers 130a, 130b.

Thus, the primary network cables 121a, 121b can enter the primary connection chamber 120 and can connect to the connector ports 170 therein. Also, the secondary network cables 131a, 131b can connect to the connector ports 170 and exit the outbound connection chambers 130a, 130b. It should be noted, however, that primary network cables 121a, 121b can connect directly to the connector ports 170 accessible only from the outbound connection chambers 130a, 130b. Similarly, the secondary network cables 131a, 131b can connect directly to the connector ports 170 accessible only from the primary connection chamber 120.

In one or more implementations, any of the outbound connection chambers 130a, 130b can provide access to one or more networks, which may have one or more security classifications. For example, the primary network cables 121b that have "classified" security classifications can connect to connector modules 160 and/or to connector ports 170 that separate the outbound connection chambers 130b from the primary connection chamber 120. Hence, users authorized to access the second outbound connection chamber 130b can network access to "classified" security classifications.

In particular, the user authorized to access the second outbound connection chamber 130b can connect secondary network cables 131b to the connector modules 160 and/or connector ports 170. Accordingly, the secondary network cables 131b connected to the connector modules 160 and/or connector ports 170 can have "classified" classifications and can connect to service boxes that have corresponding "classified" security classifications.

Additionally, the destination of the secondary network cables 131a, 131b (i.e., the particular service boxes connecting to the cable consolidation box 100 through the secondary network cables 131a, 131b) can define configuration of the outbound connection chambers 130a, 130b. For example, outbound connection chamber 130b can house the secondary network cables 131b that connect to "classified" service boxes. Thus, the outbound connection chamber 130b can have certain security features that may be unnecessary for the outbound connection chamber 130a. For instance, the outbound connection chamber 130b can include a lock as well as other security features further described below.

For example, the outbound connection chambers 130a, 130b can have a width of approximately 8 inches and height of approximately 8 inches. Alternatively, the outbound connection chambers 130a, 130b can have a width of approximately 8 inches and height of approximately 4 inches. Such width and height can depend on the number of connector ports 170 and/or connector modules 160 located within the outbound connection chambers 130a, 130b. For instance, the outbound connection chambers 130a, 130b containing four of the connector modules 160 can have a height of approximately 8 inches. It should be noted that those skilled in the art should appreciate that width and height of the outbound connection chambers 130a, 130b can be greater than 8 inches or less than 8 inches.

Additionally, each of the connector modules 160 can include one or more connector ports 170, as described above. The type of connector port 170 can vary from one implementation to the next, and within the same implementation, for example, the consolidation box 100 can include both optical connector ports as well as copper connector ports.

The number of connector ports 170 on a particular connector module 160 can depend on the size of the connector modules 160 and/or one the size of the outbound connection chamber 130*a*, 130*b*. For instance, the connector modules 160 can incorporate a single row of connector ports 170. Additionally or alternatively, connector module 160 and will rate multiple rows connector ports 170. Furthermore, connector modules 160 can include multiple connector ports 170, positioned at any location on the connector module 160, at the manufacturer may desire.

In at least one implementation, the connector modules 160 are staggered. In particular, the connector modules 160 can form one or more shelves 180 within the outbound connection chambers 130*a*, 130*b*. For example, when there are four connector modules 160 there can be three shelves 180 within the outbound connection chambers 130*a*, 130*b*. Staggering the connector modules 160 within the outbound connection chambers 130*a*, 130*b* can improve the ease and convenience of access to the connector ports 170, which may be located on the connector modules 160. Additionally, the shelves 180 can allow the secondary network cables 131*a*, 131*b* to lie thereon and can prevent the secondary network cables 1311, 131*b* from interfering with the connector ports 170. Thus, the shelves 180 can support the secondary network cables 1311, 131*b* and can improve management of multiple secondary network cables 131*a*, 131*b* within the outbound connection chambers 130*a*, 130*b*.

As described above, the primary network cables 121*a*, 121*b* and the secondary network cables 131 can enter the primary connection chambers 120 and exit the outbound connection chambers 130*a*, 130*b* of the cable consolidation box 100 respectively. For instance, the cable consolidation box 100 can have one or more entry and exit points, such as entry ports 191 and exit ports 190. Thus, the primary network cables 121*a*, 121*b* and/or secondary network cables 131 can enter the primary connection chamber 120 via the entry ports 191 and exit the outbound connection chambers 130*a*, 130*b* through the exit ports 190. As shown the entry and exit ports 190, 191 can extend through one or more sidewalls of the housing 110.

For example, the secondary network cables 131*a*, 131*b* can connect to the connector modules 160 and/or connector ports 170 and extend through the exit ports 190. In one or more implementations, the entry and/or exit ports 190, 191 can be approximately at the same level as the connector modules 160. The entry and/or exit ports 190, 191 can extend thorough portions of the housing 110 defining a particular connection chamber 120, 130*a*, 130*b*. Additionally the primary network cables 121*a*, 121*b*, for instance, can separate into network cables having "classified" and "unclassified" security classifications. The installer can divide the primary network cables 121*a*, 121*b* into "classified" and "unclassified" network cables prior to entry into the primary connection chamber 120 or at the entry ports 191. Accordingly, in one or more implementations "classified" security classification primary network cables 121*b* can enter designated entry ports 191. Similarly, "unclassified" security classification primary network cables 121*b* can enter entry ports 191 designated for "unclassified" primary network cable 121*a*.

Alternatively, the installer the separate the primary network cables 121 based on "classified" and "unclassified" security classifications after entry into the primary connection chambers 120. More specifically, the primary network cables 121 can enter the primary connection chambers 120 through the entry ports 190. Such primary network cables 121 can contain both "classified" and "unclassified" security classification network cables. Thereafter, the installer can segregate the "classified" and "unclassified" security classification primary network cables 121*a*, 121*b* and can connect the same to the appropriate connector modules 160 and/or connector ports 170.

More specifically the "classified" security classification primary network cables 121*b* can connect to the connector modules 160 and/or connector ports 170 within the "classified" security classification outbound connection chambers 130*b*. Similarly, the "unclassified" security classification primary network cables 121*a* can connect to the connector modules 160 and/or connector ports 170 within the "unclassified" security classification outbound connection chambers 130*a*.

In addition to the foregoing, the entry and exit ports 190, 191 can aid in providing security to the cables and connector ports that are associated with the consolidation box 100 and which leave exit the consolidation box 100. As shown in FIGS. 1 and 2, the entry ports 191 and exit ports 190 can extend through different sides of consolidation box 100. Separating the entry points and exit points for cables to different sides of a consolidation box housing 110, can make the wires, connections, and pathways more manageable. Having entry points and exit points on different sides of a consolidation box housing 110 can also facilitate separation between different cables. The position of the entry ports 191 can provide an additional physical security function. In particular, the entry ports 191 locations and/or positions on the housing 110 prevent access unless the consolidation box 100 is removed from the mounting location within the ceiling, floor, or wall.

In one or more implementations, the exit ports 190 and/or entry ports 191 are sized and configured such that the cable connectors on the end of each individual cable are too large, and thus not allowed to pass through the exit ports 190 and/or entry ports 191 once located inside the consolidation box 100. In other words, the configuration of the exit ports 190 can allow the network cables to pass through the aperture, but the connector on the end of the cable cannot pass through the aperture. The exit ports 190 and/or entry ports 191 can provide this security feature for a variety of different sizes or types of connectors. Moreover, the exit ports 190 and/or entry ports 191 can be limited in size such that human hands/fingers do not have the ability to access the connector ends and affect unauthorized changes to network connections.

In another configuration, the exit ports 190 and/or entry ports 191 are sized and configured such that a person cannot access the materials through the holes with either their fingers or with a pair of pliers. For example, in one or more implementation the exit ports 190 and/or entry ports 191 are oval-shaped, and sufficiently narrow that a person cannot reach into exit ports 190 and/or entry ports 191 and either plug something in or unplug something with their fingers or with a pair of pliers. The consolidation box 100 can have any number of entry and exit points. The points can have other shapes and sizes, in addition to those illustrated in the Figures that can prevent unauthorized individuals from tampering with cables or connectors through the entry and exit points.

In one or more implementations, the consolidation box 100 can include entry ports 191 and/or exit ports 190 that are dedicated to cables carrying confidential information. These points can provide cable access to a secure connection chamber. In addition, the consolidation box 100 can include entry ports 191 and/or exit ports 190 that are dedicated to cables carrying non-confidential information. These points can provide cable access to a non-secure connection chamber. In one example implementation, every connection chamber can be a secure connection chamber (which can include different levels of security classifications, e.g., Secret and Top Secret). In this case, each of the chambers would be secured.

In order to facilitate the segregated connection/security features of the various connection chambers 120, 130a, 130b, the consolidation box 100 can include one or more security features in addition to the exit and entry ports 190, 191. For example, one or more barriers 140 can separate the outbound connection chambers 130a, 130b one from another. In particular, the barrier 140 can separate a first outbound connection chamber 130a from a second connection chamber 130b. Accordingly, the barrier 140 can limit access from outbound connection chamber 130a into the outbound connection chamber 130b, and vice versa. In particular, the barrier 140 can prevent a user from accessing a particular outbound connection chamber 130a, 130b to which the user may not have security clearance. Similarly, as shown by FIG. 2, one or more rear barriers 140a can divide the first sub-connection chamber 120a from the second sub-connection chamber 120b.

In at least one implementation, the barriers 140, 140a can comprise steel, aluminum, or similar rigid material. A rigid barrier 140 can enhance the security of physically separating the different security classifications within the cable consolidation box 100. A rigid steel barrier also can electrically separate the different classification levels of network cables by preventing electromagnetic interference between separated network cables. This can be particularly beneficial if copper wires are used within the chambers on each side of the barrier 140, 140a.

Additionally, the cable consolidation box 100 can have a plurality of doors (e.g., a first front door 150a, a second front door 150b, and a rear door 150c). For instance, a first front door 150a can prevent access to the first the outbound connection chamber 130a. Similarly a second front door 150b can prevent access to the second outbound connection chamber 130b. The first front door 150a can have substantially the same size and shape as an outer portion of the first outbound connection chamber 130a. Accordingly, in a closed position (FIG. 2) the first front door 150a can cover the outbound connection chamber 130a and can prevent access thereto.

Alternatively, the cable consolidation box 100 can have a single front door that can cover multiple outbound connection chambers 130a, 130b. For example, a single door can cover the outbound connection chamber 130a and outbound connection chamber 130b. Furthermore, the single door can partially cover one or more outbound connection chambers 130a, 130b. For instance, a door can entirely cover the first outbound connection chamber 130a and can partially cover the second outbound connection chamber 130b. In still further implementations, any unclassified outbound chambers may not include a door restricting access thereto.

The cable consolidation box 100 also can have one or more rear doors. For instance, the cable consolidation box 100 can have a single rear door 150c, which can cover the primary connection chamber 120. Alternatively, the cable consolidation box 100 can have multiple rear doors, each of which can cover one or more sub-connection chambers 120a, 120b.

The doors 150a, 150b, 150c can couple to the housing 110 via one or more hinges 145. For instance, the hinges 145 can include a pin 146 and rotatable portions, which can couple to the doors 150a, 150b, 150c and to the housing 110, thereby allowing the doors 150 to swing about the pin 146. The cable consolidation box 100 also can incorporate the hinge 145 that has fewer or no pry points (i.e., that may have no edges exposed). For example, the housing 110 can have an integrated hinge 145 that can couple the doors 150 thereto. In other words, portions of the housing 110 and of the doors 150a, 150b, 150c can form the hinge 145.

Moreover, the manufacturer can cover and/or conceal any exposed portions of the hinge 145. For example, the manufacturer can cover the pin 146. More specifically, after inserting the pin 146 into one or more loops of the hinge, the manufacturer can secure a piece of metal over the loop openings, preventing disassembly of the hinge 145.

In one or more implementations, the doors 150a, 150b, 150c can couple to the housing 110 without the hinge 145. For example, the doors 150a, 150b, 150c can have a sliding connection with the housing 110. Moreover, one or more of the doors 150a, 150b, 150c can have a hinged connection (i.e., can couple with the hinge 145) and one or more doors 150a, 150b, 150c can have a sliding connection with the housing 110.

As previously mentioned, the doors 150a, 150b, can cover the outbound connection chambers 130a, 130b and can prevent access thereto. Accordingly, the housing 110 can have a shape that corresponds to one or more doors 150a, 150b. For instance, the sidewalls 111, 112, 114 can form or define openings 200 of the outbound connection chambers 130. The openings opening 200 can have a shape defined by the sidewalls 111, 112, 114 and the barrier 140. Accordingly, the doors 150a, 150b can have a shape that can correspond with the shape of the openings 200.

More specifically, the sidewalls 112, 114 and the barrier 140 can form a straight portion and an angled portion of the openings 200. Similarly, the doors 150a, 150b can have a straight portion and an angle portion that can cover and close the openings 200. Those skilled in the art, however, should appreciate that the openings 200 and the doors 150a, 150b 0 can have various other shapes.

In one or more implementations, the doors 150a, 150b, 150c can have one or more lips 151a-151f. One or more of the lips 151a-151f can fit into one or more channels in the housing 110. For example, the lips 151c, 151d can fit into a channel 141 of the barrier 140. The side lips 151a, 151f etc. also can fit within in channels within the sidewalls 112 and/or 114 or otherwise within the consolidation box 100. Thus, the barrier 140 and/or the sidewalls 111, 112, 114 can incorporate a channel that can provide an additional security feature for the cable consolidation box 100 by securing the lips 151 of the doors 150a, 150b, 150c.

For instance, after the lip 151d enters the channel 141 of the barrier 140, the cable consolidation box 100 can have fewer portions susceptible to prying. More specifically, the lips 151c, 151c and the channels 141 located within the barrier 140 and or sidewalls 111, 112, 114 can cooperate to conceal one or more edges of the doors 150a, 150b, 150c. Therefore, an unauthorized user may not have access to the edges of the doors 150a, 150b, 150c, thereby preventing the unauthorized user from inserting a tool (e.g., a screwdriver or a pry bar) between the edges of the door 150a, 150b, 150c and a portion of the housing 110.

To further limit users' access to the connection chambers (e.g., to the primary connection chambers 120 and/or the outbound connections chambers 130a, 130b), one or more of the doors 150a, 150b, 150c can include a locking assembly 155. Although the type of locking assembly 155 can vary from one implementation to the next, in at least one implementation, the locking assemblies 155 can include a lock 156 and a tab 157. The lock 156 can require a key for engaging and releasing from the respective tab 157. In one or more implementation, the locking assembly 155 on each door 150a, 150b, 150c requires a unique key to open. Accordingly, the user can insert the key into the lock 156, to release the tab 157 from the lock 156. After the tab 157 is released from the lock 156, the user may open the respective door 150a, 150b, 150c.

In alternative implementation, the locking assemblies 155 can comprise electromagnetic locks, electric locks, combination locks, padlocks (e.g., GSA padlocks), touchpad locks, or any other type of locking device that can securely keep a door 150a, 150b, 150c securely closed when in the locked position.

In at least on implementation, the cable consolidation box 100 can incorporate an alarm system. For example, alarms can be installed within one or more connection chambers (e.g., within the primary connection chambers 120 and/or within the outbound connection chambers 130a, 130b). Such alarms can detect unauthorized access to one or more of the connection chambers, vibration or impact of the cable consolidation box 100 (i.e., attempted break-in), as well as other unauthorized activities related to the cable consolidation box 100 (e.g., accessing, damaging, removing, etc).

The alarm system can include a sensor that can detect the opening of one or more doors 150a, 150b, 150c. For example, in one or more implementations, the sensor can comprise dry contact buttons 162. The dry contact buttons 162 can depress when the particular door 150a, 150b, 150c is closed. Similarly, the dry contact buttons 162 can release when the particular door 150a, 150b, 150c is opened. In alternative implementations, the alarm system can comprise triggers as well as other electric and mechanical sensors. With an alarm installed, authorized individuals that need to open the doors and access a chamber may schedule interruptions in the alarm system. Alternatively, the user can deactivate the alarm with a password or code. Activating an alarm can trigger different responses. For example, the alarm can send a message to security personnel who can investigate the box or dispatch others to investigate the box. In another implementation, an audible siren or flashing lights can sound when an alarm is triggered.

The construction of the housing 110 can also act as a security feature. For example, the sidewalls 111, 112, 113 and 114 can comprise sheet metal material (e.g., steel, aluminum, etc.). In one implementation, the housing 110 comprises a strong metal, such as stainless steel or other materials with similar properties. For example, the housing 110 can comprise sixteen-gauge steel. The housing 110 can include an additional measure of security by overlapping the corners and edges of the housing. For example, the housing 110 can have corners and edges that include an additional length of material to overlap and cover the corners. Thus, there are no small openings or gaps in the housing 110 at its corners or edges. This can be important from a security standpoint, as corners where two separate pieces of material come together often leave a small gap and provide a pry point that an unauthorized person can use to gain access into the box.

Accordingly, the manufacturer can weld, fold and/or secure the sidewalls 111, 112, 113 and 114 one to another as well as to a base 116. Alternatively, the manufacturer can form the housing 110 from a solid material. In other words, the manufacturer can remove material from a solid block thereby forming the housing 110. In some instances such approach may be costly and/or not economical, depending on the size of the housing 110.

In one or more implementations, the cable consolidation box 100 also can conceal screw heads and/or other fastening components used for mounting or assembly of the cable consolidation box 100. More specifically, the manufacturer or installer can position such fastening within one or more of the connections chambers of the cable consolidation box 100. To the extent that fasteners may be exposed outside of the consolidation box, the installer can use rivets or specialty screws, which can aid in deterring unauthorized removal and/or disassembly of the cable consolidation box 100.

The interior of the housing 110 can have additional characteristics that improve the function and design of the consolidation box 100. For example, the consolidation box 100 the previously mentioned staggering of the connector modules 160 can provide for ease of use that includes a convenient viewing angle, connection angle, and the ability to easily label the connections in a high port capacity environment. The tiered shelving system allows a network architect to bring in multiple layers of cabling without having to stack cables on top of one another. In addition to the shelved connection panels, the connection chambers can include distribution cassettes, jacks, and or other connectors that are pre-fabricated with matching colors and/or keyed connectors to minimize installation time and connection errors.

In at least one implementation, connector ports 170 can have different colors that correspond to security classification levels. Color coding connector ports can facilitate and ensure accurate connections within a network having several different classification levels. Along similar lines, the doors of the consolidation box 100 can also have a color coding. For example, the door 150b covering a secure outbound connection chamber 130b can have a red color. A door 150a covering an unsecure outbound connection chamber 130a can have a black color. Color coding the doors may facilitate periodic inspections of the consolidation boxes. With color coded doors, an inspector can quickly identify whether a door houses confidential information. In addition, the doors can also include a security level words or acronym. For example, the acronym SIPR, which stands for "secure internet protocol" can reside on a door housing secure information. The acronym NIPR, which stands for "non-secure internet protocol" can reside on a door housing non-secure information.

Additionally, the layout of the interior of the connection chambers can allow several types of network cables to reside within the same box. Moreover, the interior configuration of the consolidation box 100 can provide standard specified clearances for both fiber and copper cabling terminations, regardless of combination of fiber or copper cabling connected in the consolidation box 100.

Figure 3:
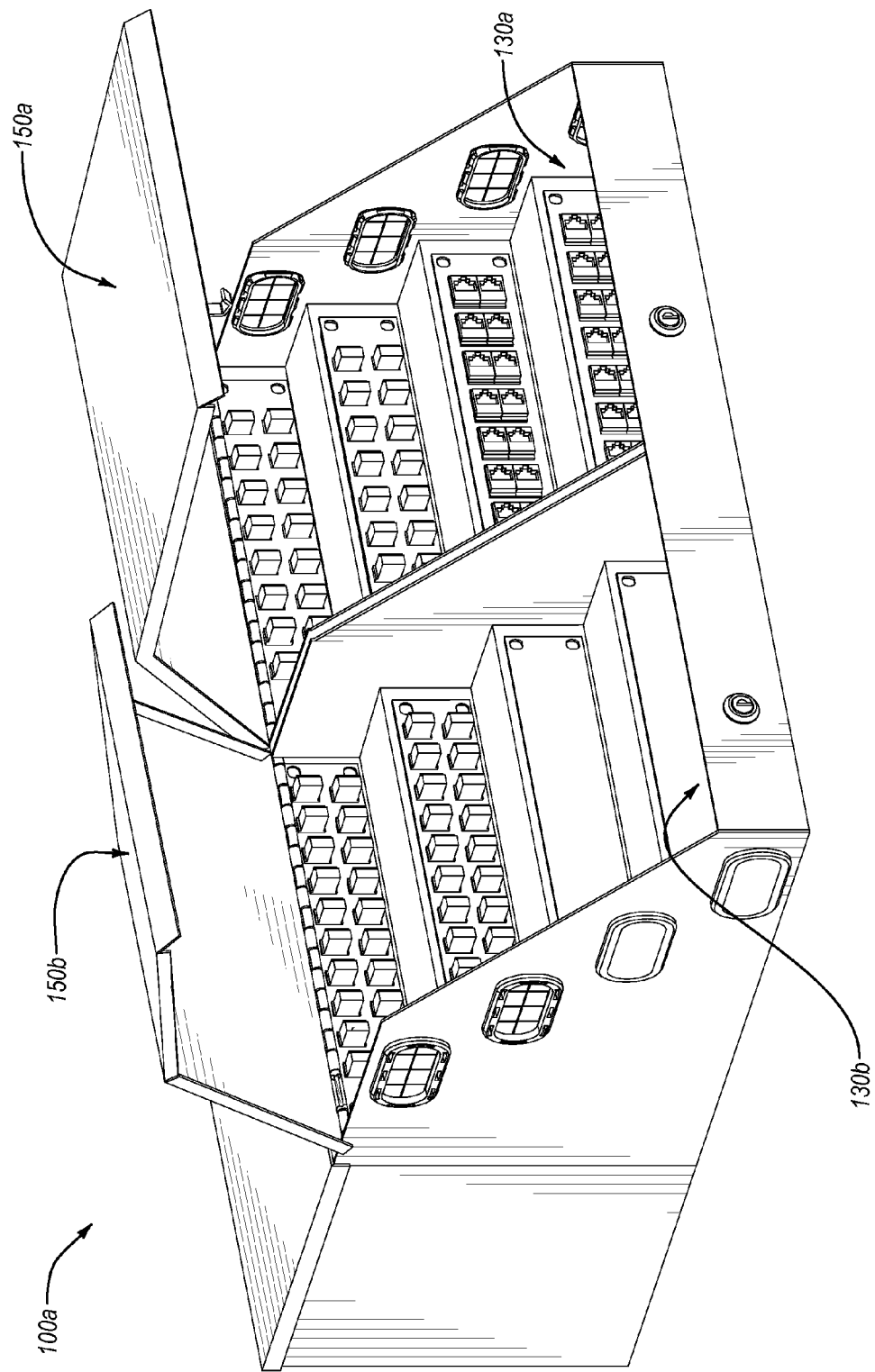
FIG. 3 illustrates a front perspective view of another consolidation box in accordance with one or more implementations of the present invention.

One will appreciate in light of the disclosure herein that the shape on the configuration of the consolidation boxes of the present invention can vary from the implementation shown in FIGS. 1 and 2. For example, FIG. 3 illustrates another implementation of a consolidation box 100a. The consolidation box 100a can have the same configuration as the consolidation box 100 shown in FIGS. 1 and 2, albeit that the first and second outbound chambers 130a, 130b and respective doors 150a, 150b can have the same size.

Thus, one will appreciate that the cable consolidation box 100 can have the outbound connection chambers 130a, 130b that have various size relationships one with respect to another. For example, the outbound connection chamber 130a can be larger than the outbound connection chamber 130b (FIG. 1). Accordingly, the outbound connection chamber 130a can house a greater number of connector modules 160 and/or connector ports 170 than the outbound connection chamber 130b. Thus, the outbound connection chamber 130a can accept a greater number of secondary cables 131a.

Figure 4:
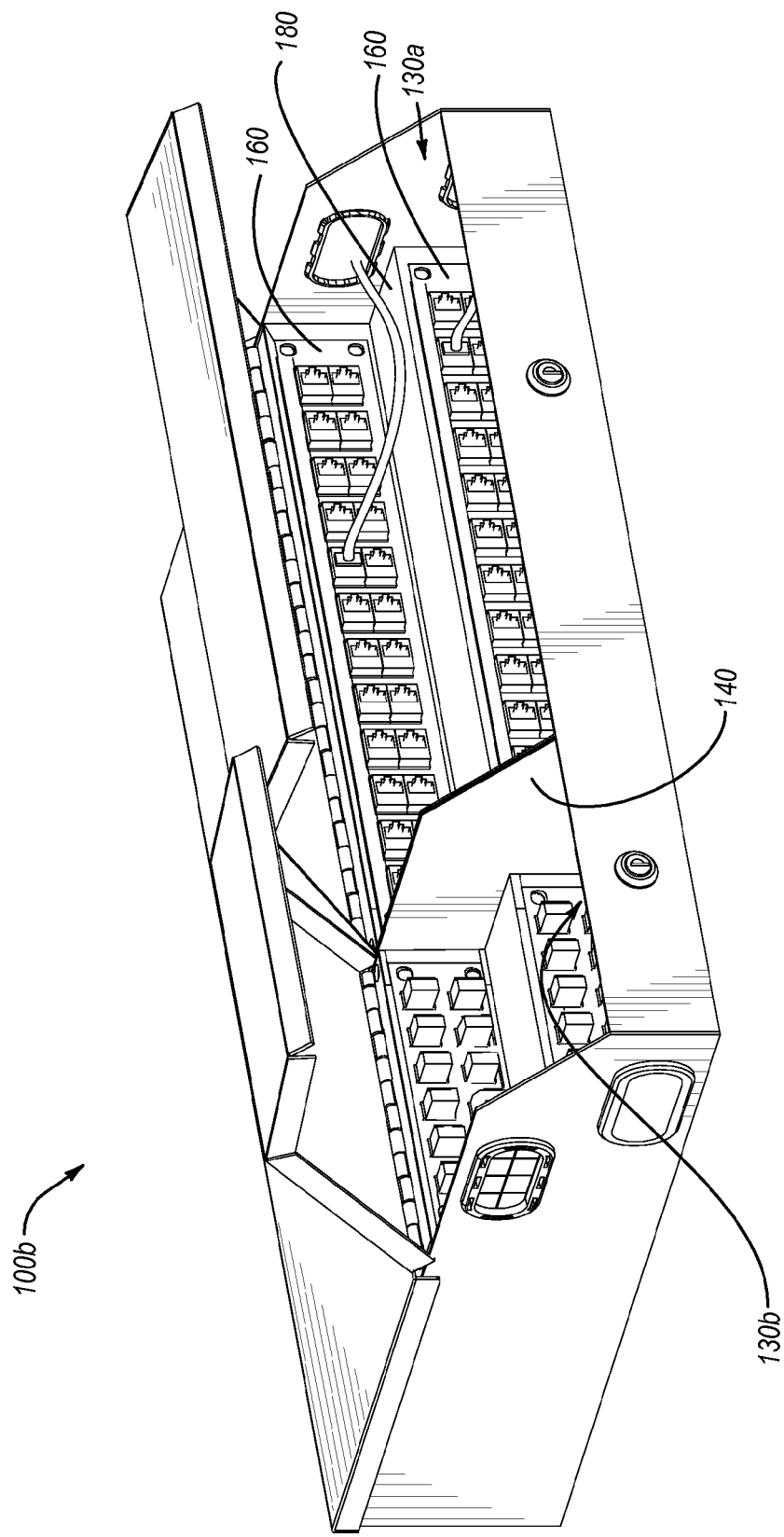
FIG. 4 illustrates a front perspective view of still another consolidation box in accordance with one or more implementations of the present invention.

Additionally, while FIGS. 1-3 illustrates outbound connection chambers 130a, 130b with four rows of connector modules 160, the present invention is not so limited. For example, FIG. 4 illustrates a consolidation box 100b similar to the consolidation box 100, albeit that each outbound connection chamber 130a, 130b includes two rows of connector modules 160 and a single shelf. Thus, one will appreciate that the size and shape of the consolidation box can vary depending upon the needs of the network.

Figure 5:
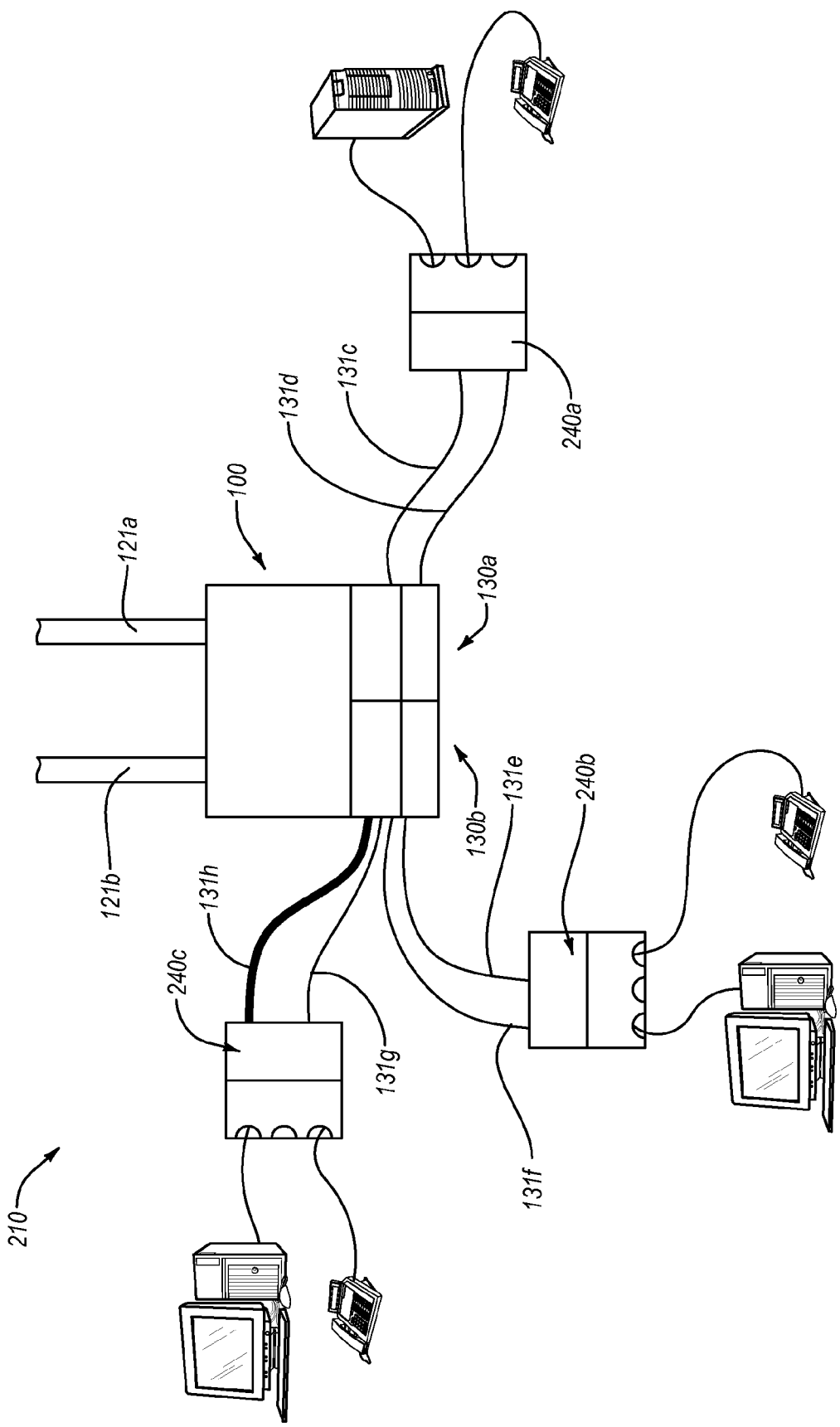
FIG. 5 illustrates a diagram of a system for and securing a plurality of network cables in accordance with one or more implementations of the present invention.
Figure 2:
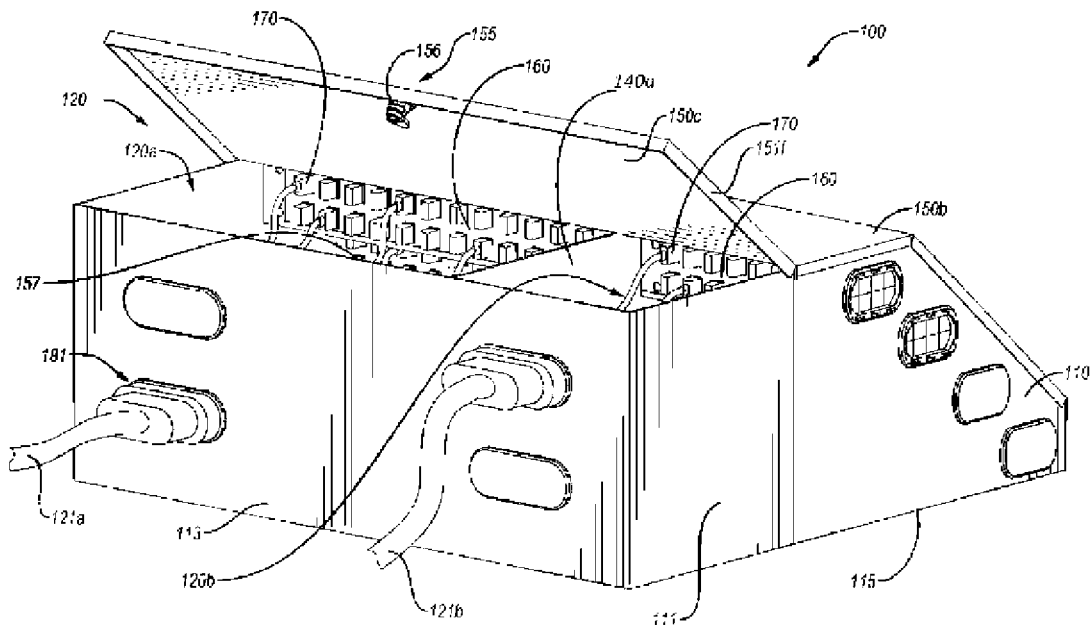

As described above, the cable consolidation box 100 can connect various portions of one or more networks. In particular, the network administrator can design a secure network cable distribution system 210, as illustrated in FIG. 5. More specifically, a cable consolidation box 100 can connect a first portion of the network (such as a telecommunications rack) with a second portion of the network (e.g., the service boxes 240a, 240b, 240c). For example, bundled primary cables 121a, 121b can run from a telecommunications rack to the cable consolidation box 100. Then secondary network cables 131c-131h can run from the outbound connection chambers 130a, 130b of the cable consolidation box 100 to service boxes 240a, 240b, 240c or other termination points.

In at least one implementation, as shown by FIG. 5, the service boxes 240a, 240b, 240c can service computers, servers, telephones, as well as other equipment that may connect to a network (collectively "networkable equipment"). Moreover, the service boxes 240a, 240b, 240c can have various security classifications and can provide access to various networkable equipment based on the security classifications. For example, cable consolidation box 100 can distribute one or more secondary network cables having a "classified" security classification to one or more "classified" security classification service boxes 240 (e.g., service boxes 240b, 240c). The network administrator can then allow users with an appropriate security clearance to connect networkable equipment to the "classified" security classification service boxes 240b, 240c.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A cable consolidation box for securing a plurality of network cables having two or more security classifications and for providing access to a plurality of securable network connections based at least in part on security clearance to access a particular security classification network, the cable consolidation box comprising:
   a housing;
   one or more primary connection chambers configured to physically secure primary network cables from a first security classification network and a second security classification network;
   a first outbound connection chamber disposed within the housing and configured to secure secondary network cables for connecting to the first security classification network;
   a second outbound connection chamber disposed within the housing and configured to secure secondary network cables for connecting to the second security classification network;
   a barrier separating the first and second outbound connection chambers, the barrier preventing physical access to one of the first and second outbound connection chambers from the other of the first and second outbound chambers and preventing electrical communication between the first and second outbound connection chambers;
   a first door coupled to the housing and sized and configured to selectively provide access to the first outbound connection chamber;
   a second door coupled to the housing and sized and configured to selectively provide access to the second outbound connection chamber;
   a third door coupled to the housing and sized and configured to selectively provide access to the one or more primary connection chambers; and
   one or more locks configured to selectively secure one or more of the first, the second, and the third doors to the housing.

2. The cable consolidation box as recited in claim 1, further comprising a plurality of connector modules separating the first and second outbound connection chambers from the one or more primary connection chambers and preventing physical access to the one or more primary connection chambers from the first and second outbound connection chambers.

3. The cable consolidation box as recited in claim 2, wherein the one or more primary connection chambers are positioned behind and abut both of the first and second outbound connection chambers.

4. The cable consolidation box as recited in claim 2, further comprising one or more sensors configured to detect when one or more of the first, second, and third doors are opened.

5. The cable consolidation box as recited in claim 1, further comprising:
   a first lip extending from the first door; and
   a channel in the barrier sized and configured to accept the first lip of the first door.

6. The cable consolidation box as recited in claim 5, further comprising:
   a second lip extending from the second door;
   wherein the channel of the barrier is sized and configured to accept both of the first and second lips.

7. The cable consolidation box as recited in claim 1, further comprising one or more entry ports sized and configured to receive and pass there through one or more of the primary network cables, the one or more entry ports being positioned in a rear wall of the housing.

8. The cable consolidation box as recited in claim 7, further comprising one or more exit ports associated with each of the first and second outbound connection chambers, the one or more exit ports being sized and configured to receive and pass there through one or more of the second network cables, at least one of the one or more exit ports being positioned in a side wall of the housing associated with the first outbound connection chamber, and at least one of the one or more exit ports being positioned in a side wall of the housing associated with the second outbound connection chamber.

9. A cable consolidation box for a plurality of network cables having two or more security classifications and providing access to a plurality of securable network connections based on security clearance to access a particular security classification network, the cable consolidation box comprising:
   a housing;
   one or more primary connection chambers disposed within the housing and sized and configured to secure primary network cables from both of a first security classification network and a second security classifications network;
   a first outbound connection chamber disposed within the housing;
   a first set of staggered connector modules disposed between the first outbound connection chamber and the one or more primary connection chambers, the first set of staggered connector modules preventing physical access to the one or more primary connection chambers from the first outbound connection chamber;
   a second outbound connection chamber disposed within the housing;
   a second set of staggered connector modules disposed between the second outbound connection chamber and the one or more primary connection chambers, the second set of staggered connector modules preventing physical access to the one or more primary connection chambers from the second outbound connection chamber;

a barrier separating the first and second outbound connection chambers, the barrier preventing physical access to one of the first and second outbound connection chambers from the other of the first and second outbound chambers and preventing electrical communication between the first and second outbound connection chambers;

a plurality of doors coupled to the housing and sized and configured to provide selective access to the first and second outbound connection chambers; and one or more locks coupled to one or more of the housing and one or more doors of the plurality of doors, and configured to selectively prevent access to one or more of the first and second outbound connection chambers.

10. The cable consolidation box as recited in claim 9, wherein one or more connector modules of the first set of staggered connector modules form one or more shelves.

11. The cable consolidation box as recited in claim 10, further comprising one or more entry ports sized and configured to accept the primary network cables, the one or more entry ports each being positioned in a rear wall of the housing and extending into the one or more primary connection chamber.

12. The cable consolidation box as recited in claim 11, further comprising two or more exit ports sized and configured to accept secondary network cables, at least one of the two or more exit ports being positioned in a sidewall of the housing and extending into the first outbound connection chamber, and at least one of the two or more exit ports being positioned in a sidewall of the housing and extending into the second outbound connection chamber.

13. The cable consolidation box as recited in claim 11, wherein the two or more entry ports are positioned proximate to the one or more shelves.

14. The cable consolidation box as recited in claim 9, wherein the plurality of doors comprises:
 a first front door sized and configured to cover the first outbound connection chamber;
 a second front door sized and configured to cover the second outbound connection chamber; and
 a rear door sized and configured to cover one or more primary connection chambers.

15. A secure network cable distribution system for securing a plurality of network cables from networks with different security classification and distributing network cables to one or more service boxes based on a particular security classification of the network cables, the system comprising:
 a first primary network cable of a first security classification network;
 a second primary network cable of a second security classification network;
 a cable consolidation box, comprising:
  a housing;
  one or more primary connection chambers securing the first primary network cable and the second primary network cable;
  a first outbound connection chamber having a first connector module connected to the first primary network cable, the first connector module separating the first outbound connection chamber from the one or more primary connection chambers and preventing physical access to the one or more primary connection chambers from the first outbound connection chamber;
  a second outbound connection chamber having a second connector module connected to the second primary network cable, the second connector module separating the second outbound connection chamber from the one or more primary connection chambers and preventing physical access to the one or more primary connection chambers from the second outbound connection chamber;
  a barrier separating the first and second outbound connection chambers, the barrier preventing physical access to one of the first and second outbound connection chambers from the other of the first and second outbound chambers and preventing electrical communication between the first and second outbound connection chambers;
  a pair of doors coupled the housing and sized and configured to provide selective access to the first and second outbound connection chambers;
  one or more locks configured to selectively prevent access to one or more of the first and second outbound connection chambers;
 a first service box located remotely for the cable consolidation box;
 a second service box located remotely for the cable consolidation box and the first service box;
 a first set of secondary network cables running from the first connector module in the first outbound connection chamber to the first service box; and
 a second set of secondary network cables running from the second connector module in the second outbound connection chamber to the second service box.

16. The system as recited in claim 15, wherein the first security classification is different from the second security classification.

17. The system as recited in claim 15, wherein the first set of secondary network cables and the second set of secondary network cables have different security classifications.

18. The system as recited in claim 15, further comprising one or more of a computer, telephone, or server connected to each of the first and second service boxes.

19. The system as recited in claim 15, wherein each of the first and second outbound connection chambers comprises a plurality of staggered connection modules.

20. The system as recited in claim 15, further comprising a third door coupled the housing and sized and configured to provide selective access to the one or more primary connection chambers.

* * * * *

UNITED STATES PATENT AND TRADEMARK OFFICE
CERTIFICATE OF CORRECTION

Page 1 of 2

PATENT NO. : 9,059,576 B2
APPLICATION NO. : 13/579269
DATED : June 16, 2015
INVENTOR(S) : Isaacks et al.

It is certified that error appears in the above-identified patent and that said Letters Patent is hereby corrected as shown below:

In Drawings
Figure 2, change reference "140b" to --140a-- See attached sheet

In Specification

Column 2
Line 33-34, change "can allow provide access" to --can allow or provide access--

Column 6
Line 7, change "simply installation" to --simplify installation--

Column 9
Line 22 & 24, change "1311" to --131a--
Line 46, change "thorough" to --through--
Line 60, change "the separate" to --can separate--

Column 12
Line 30, remove "0"
Line 37, change "within in channels" to --within channels--

Column 13
Line 6, change "at least on implementations" to --at least one implementations--

Signed and Sealed this
Eighth Day of March, 2016

Michelle K. Lee
*Director of the United States Patent and Trademark Office*